Dec. 23, 1958 W. M. LEEDS 2,866,045

CIRCUIT INTERRUPTERS AND CONTACT ARRANGEMENTS THEREFOR

Filed Dec. 20, 1956 10 Sheets-Sheet 1

INVENTOR
Winthrop M. Leeds.
BY
Willard R. Crout
ATTORNEY

Dec. 23, 1958 W. M. LEEDS 2,866,045

CIRCUIT INTERRUPTERS AND CONTACT ARRANGEMENTS THEREFOR

Filed Dec. 20, 1956 10 Sheets-Sheet 5

Dec. 23, 1958 W. M. LEEDS 2,866,045

CIRCUIT INTERRUPTERS AND CONTACT ARRANGEMENTS THEREFOR

Filed Dec. 20, 1956

10 Sheets-Sheet 7

Dec. 23, 1958 W. M. LEEDS 2,866,045

CIRCUIT INTERRUPTERS AND CONTACT ARRANGEMENTS THEREFOR

Filed Dec. 20, 1956 10 Sheets-Sheet 10

United States Patent Office 2,866,045

Patented Dec. 23, 1958

2,866,045

CIRCUIT INTERRUPTERS AND CONTACT ARRANGEMENTS THEREFOR

Winthrop M. Leeds, Forest Hills, Pa., assignor to Westinghouse Electric Corporation, East Pittsburgh, Pa., a corporation of Pennsylvania Application December 20, 1956, Serial No. 629,604

11 Claims. (Cl. 200—148)

This invention relates to circuit interrupters in general and, more particularly, to circuit-interrupter mounting arrangements and contact structures therefor.

A general object of the present invention is to provide an improved circuit interrupter which will be more effective, and which will operate more quickly, while at the same time having a lower manufacturing cost than circuit interrupters heretofore employed in the art.

A more specific object of the present invention is to provide an improved fluid-blast circuit interrupter having a novel piston assembly, and operating in an improved manner.

A further object of the present invention is to provide an improved contact arrangement for a circuit interrupter, which will insure ready transfer of the current between a pair of cooperable contact surfaces, while at the same time preventing appreciable friction losses therebetween.

A further object of the present invention is to provide an improved fluid-blast circuit interrupter of the single-bushing type, in which an improved piston construction is provided for effectively effecting extinction of the established arc.

Another object of the invention is to provide a novel roller assembly for supporting the movable contact and fluid displacement assembly, which will also serve to bring about the transfer of current between a pair of relatively movable contacts with very low friction and electrical losses.

Further objects and advantages will readily become apparent upon reading the following specification, taken in conjunction with the drawings, in which.

Figure 1:
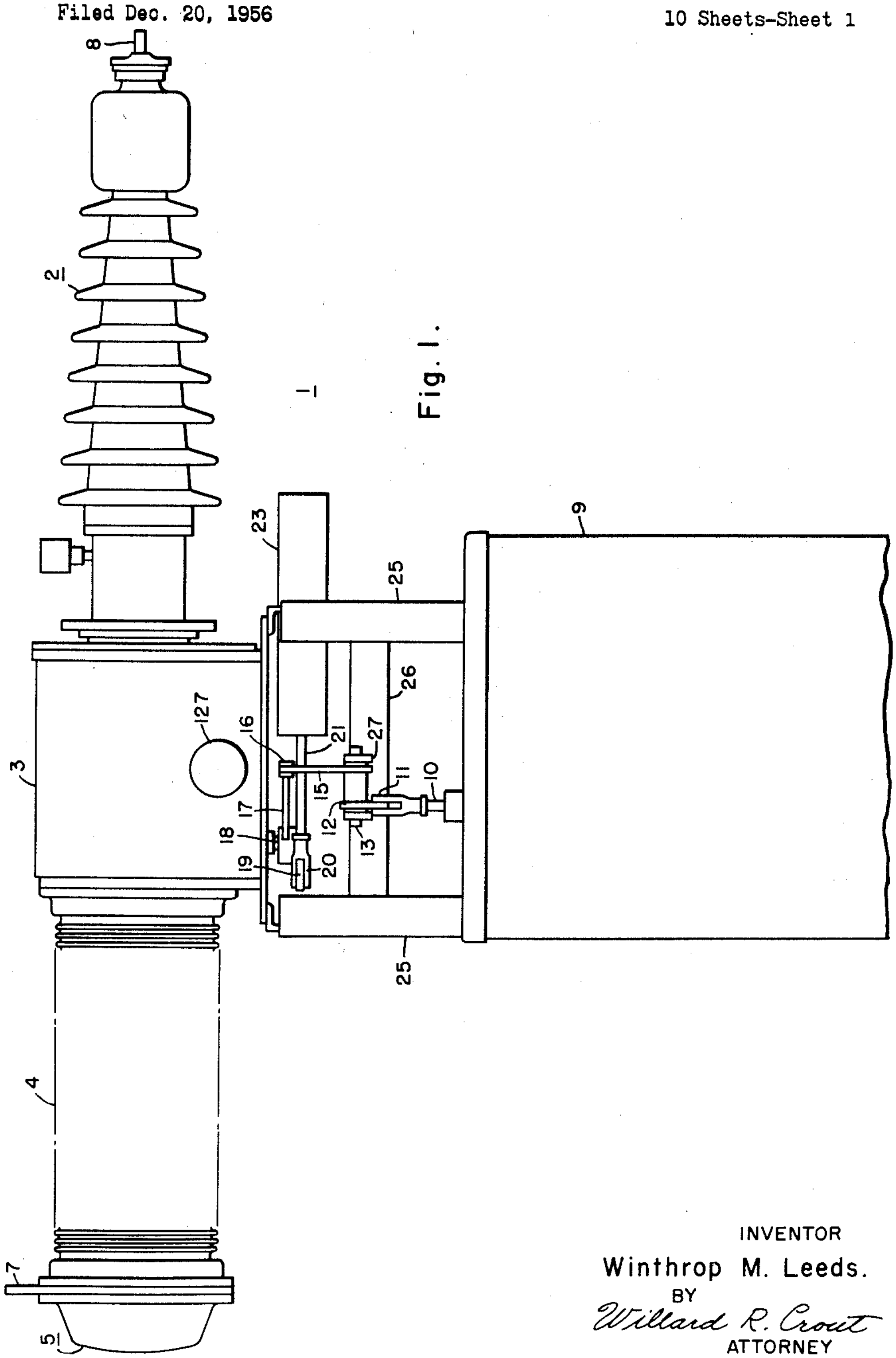
Figure 1 is a front elevational view of a circuit interrupter embodying the principles of the present invention, and shown in the closed-circuit position.
Figure 10:
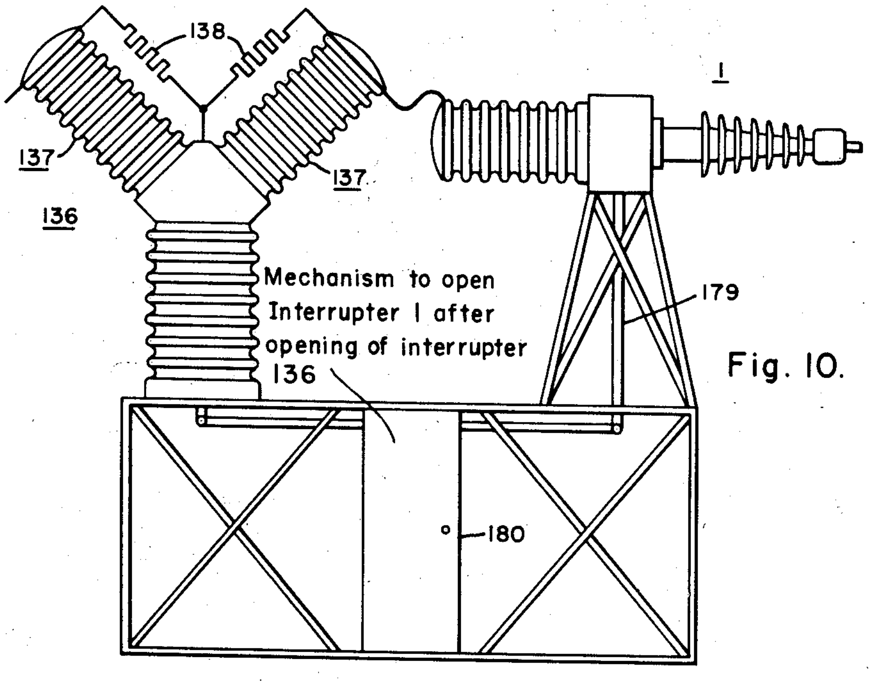
Figure 9:
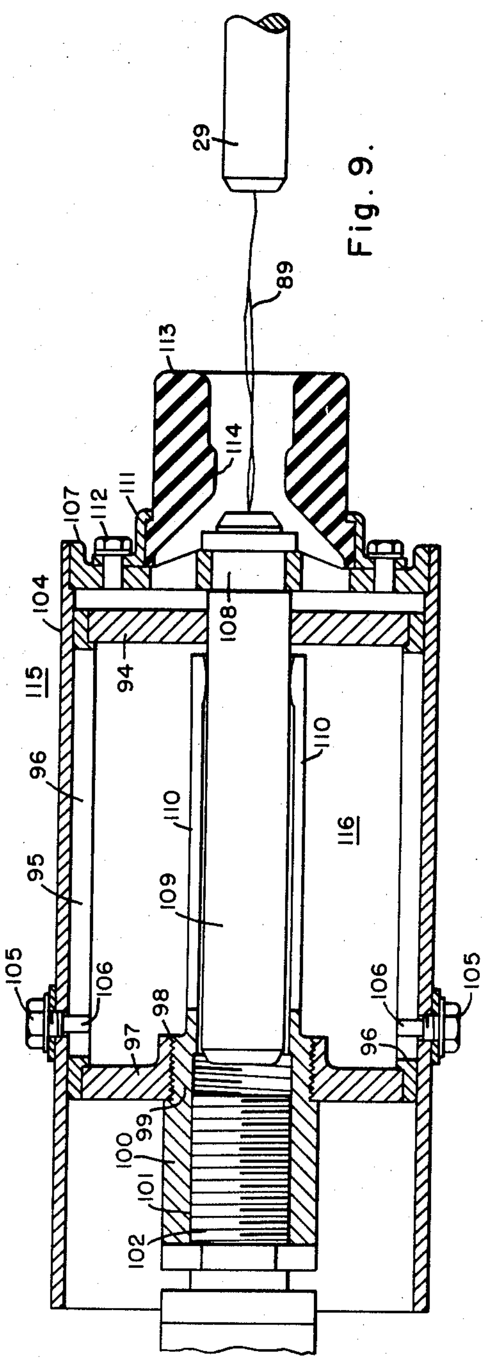
Figure 8A:
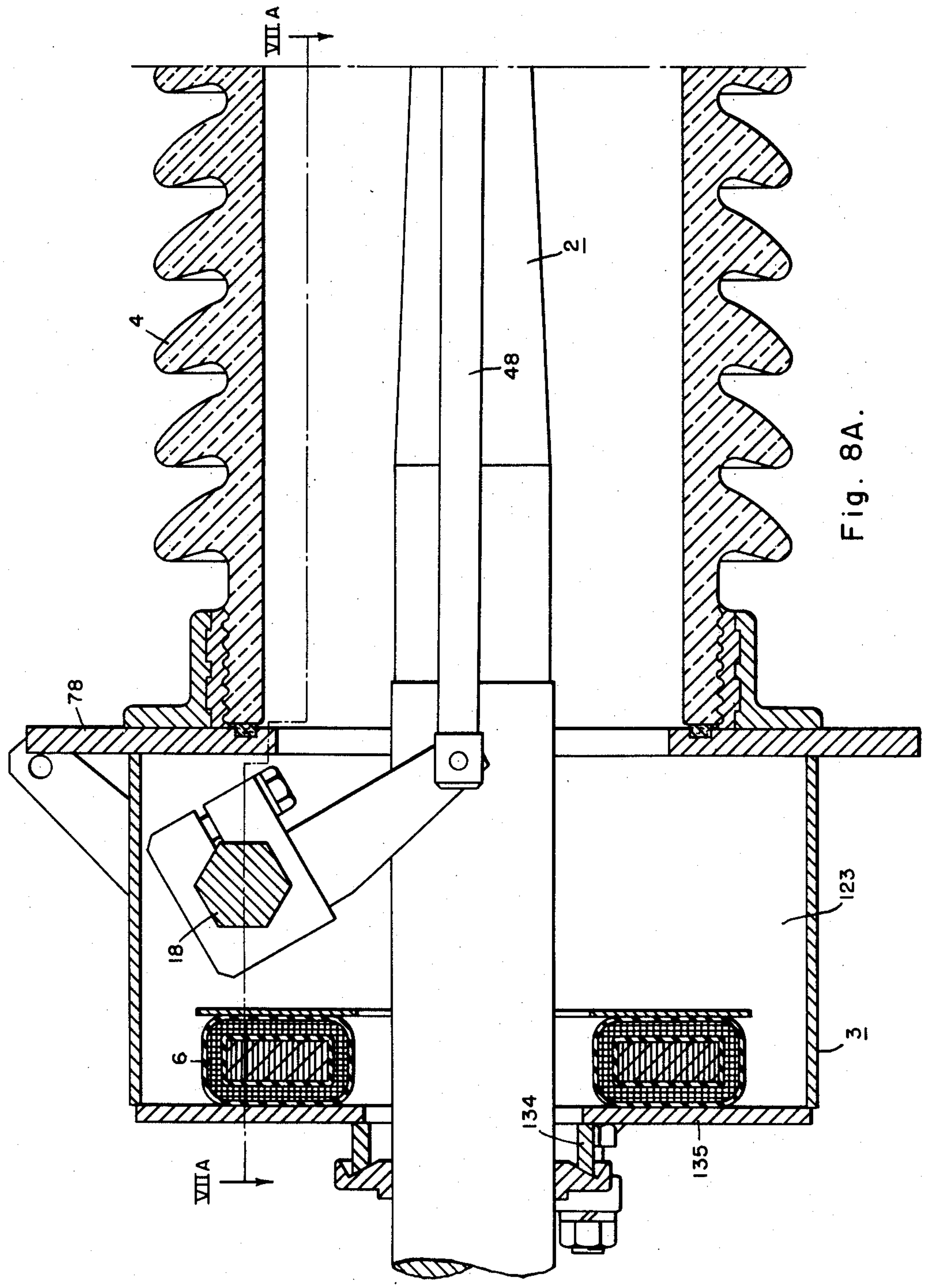
Figs. 8A and 8B illustrate a vertical sectional view taken along the lines respectively VIIIA—VIIIA of Fig. 7A and VIIIB—VIIB of Fig. 7B, with the arc-extinguishing unit in section, and the contact structure being illustrated in the closed position.
Figure 8B:
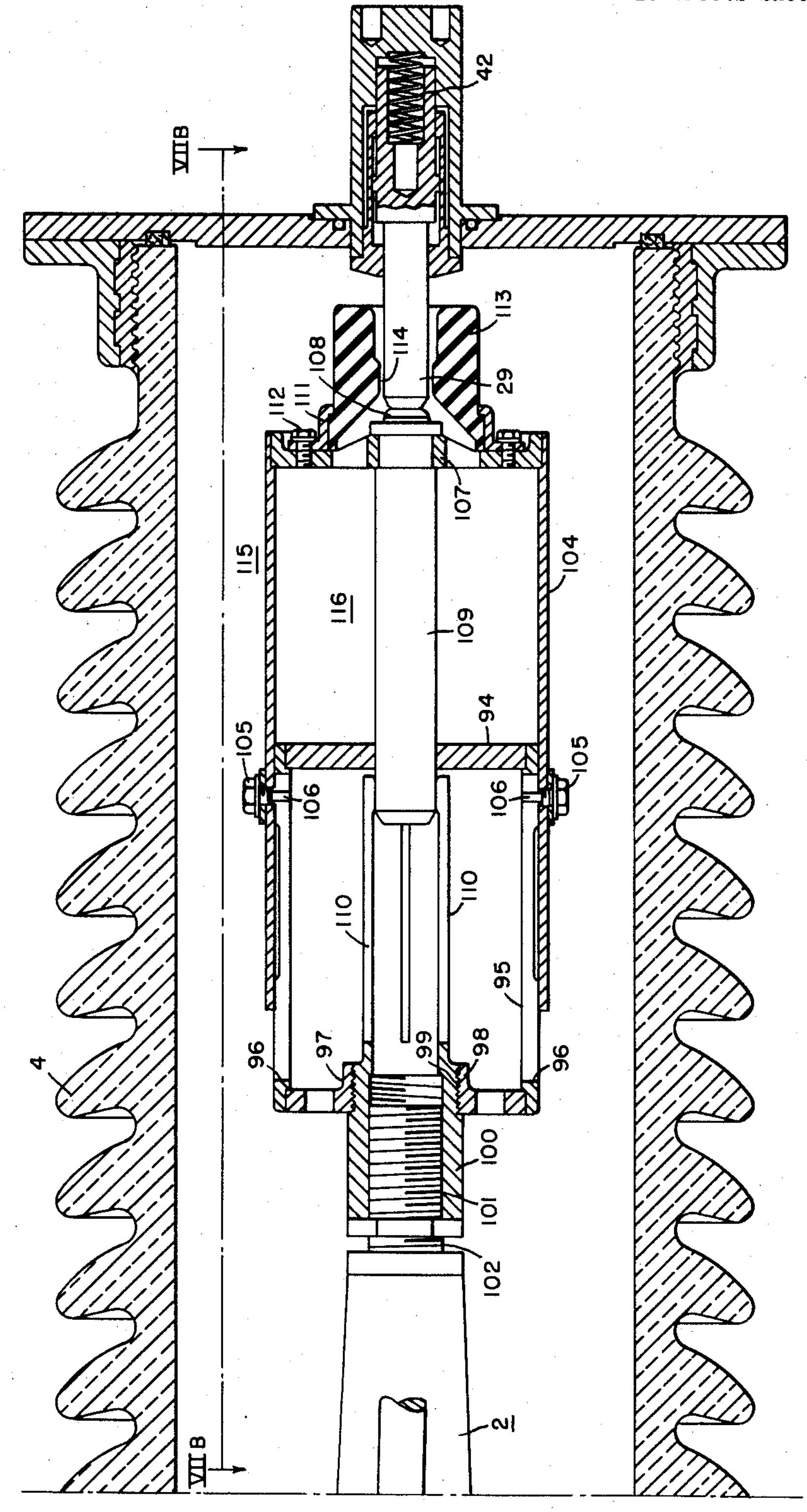

Fig. 9 is an enlarged vertical sectional view through the modified type of arc-extinguishing unit of the interrupter illustrated in Fig. 8B in the open circuit position; and Fig. 10 illustrates a side elevational view of a circuit interrupting assemblage utilizing a single-bushing type of interrupter, as illustrated in Fig. 1, in series with a power circuit interrupter having resistance shunts, the single-bushing interrupter serving as an impedance interrupter, and also as an isolating structure.

Figure 2:
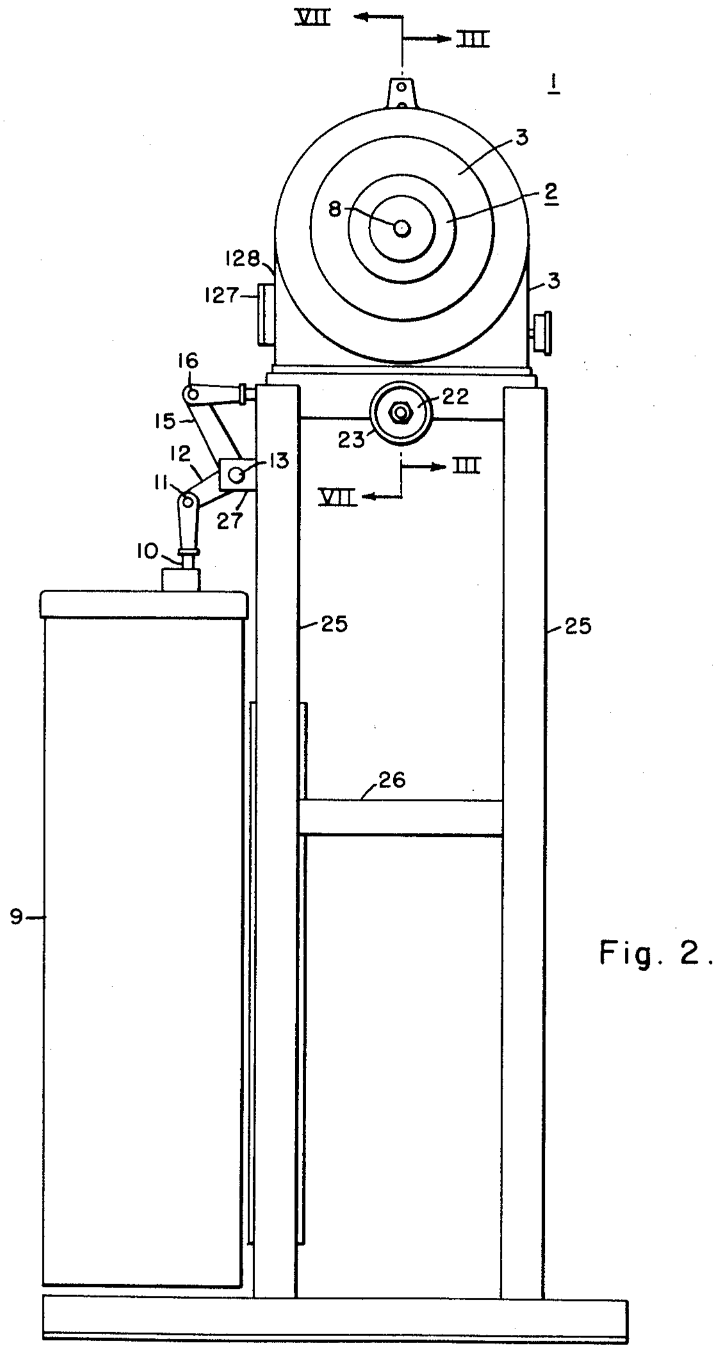
Figure 2 is an end elevational view of the circuit interrupter illustrated in Fig. 1, viewing the same from its right-hand end, as shown in Fig. 1.

Referring to the drawings, and more particularly to Figs. 1 and 2 thereof, the reference numeral 1 generally designates a circuit interrupter of the single-bushing type, including a terminal bushing of the condenser type, generally designated by the reference numeral 2, fixedly mounted to a grounded mechanism housing casing 3, the latter supporting adjacent its other end an insulating casing 4, preferably formed of a suitable weather-proof material, such as porcelain. At the other end of the insulating casing 4 is disposed a flanged closure cap 5, having a line terminal connection 7. The terminal bushing 2, of substantially standard construction with a current transformer 6 thereabout, also has a line terminal connection 8 at its righthand end, as viewed in Fig. 1. As a result, the circuit through the circuit interrupter generally passes axially along the structure from the terminal connection 7, through the interrupting assembly, disposed interiorly within the casing 4, and through the terminal bushing 2 to the right-hand line-terminal connection 8.

Suitable means are provided, within a mechanism casing 9, to effect the vertical movement of an operating rod 10, the upper end of which is bifurcated and pivotally connected, as at 11, to an arm 12, fixedly secured to one end of an operating shaft 13. Also fixedly secured to the operating shaft 13 is a second actuating arm 15, the latter being pivotally connected as at 16, to one end of an operating arm 17. The arm 17 is secured to a vertically extending operating shaft 18, the latter extending upwardly into the mechanism housing 3 in a manner indicated in Fig. 3B.

A second arm 19 is also rotatably secured with the shaft 18, and is pivotally connected, as at 20, to a spring rod 21, the right-hand end of which, as viewed in Fig. 1, contains a spring seat 22 (Fig. 2), against which seats a battery of compression springs, not shown, disposed within a spring housing 23. Generally, the function of the springs, within the spring housing 23, is to become compressed, or charged therein, so that when the contact structure is closed, the springs will tend to bias the operating shaft 18 in such a direction as to effect contact opening.

The mechanism, which is contained within the mechanism casing 9, may be of any suitable type, and forms no part of the present invention. It is desirable to provide a mechanism which will simultaneously effect contact closure and charging of the compression springs within the spring housing 23, so that the latter will tend to bias the contacts in the opening direction. Thus, no dependence need be had upon the mechanism within housing 9 after tripping, the springs within tubular housing 23 being solely relied upon to effect contact opening, as hereinafter described.

As noted more particularly in Fig. 2, the mechanism housing casing 3 is grounded, being supported vertically by a plurality of uprights 25, which may be angle-irons. Cross-braces 26 may be welded between the uprights 25 to insure stability. Suitable brackets, such as the brackets 27, may be welded to the uprights 25 to accommodate the operating shafts. As a result the entire structure is very rigid.

Figure 3A:
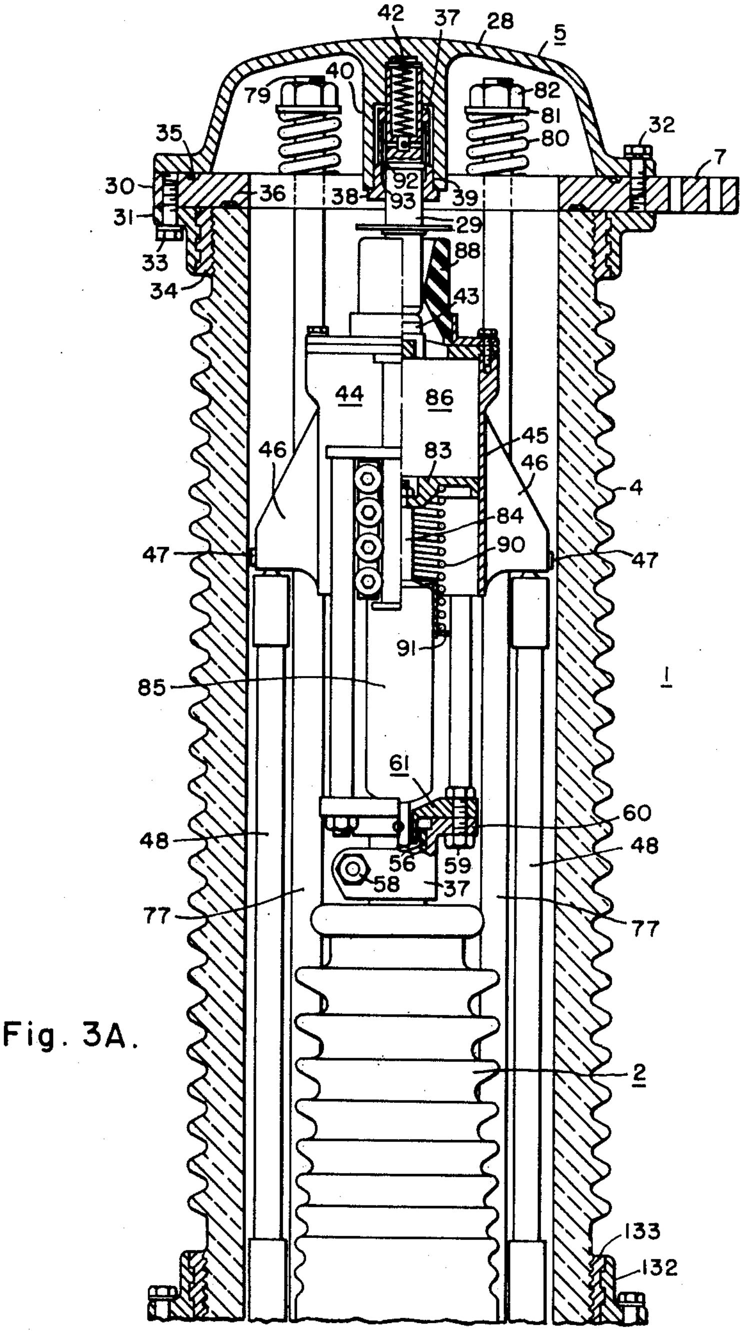
Figs. 3A and 3B illustrate a cross-sectional view through the interrupting assembly taken substantially along the line III—III of Fig. 2 looking in the direction of the arrows, and the contact structure being shown in the closed-circuit position.
Figure 3B:
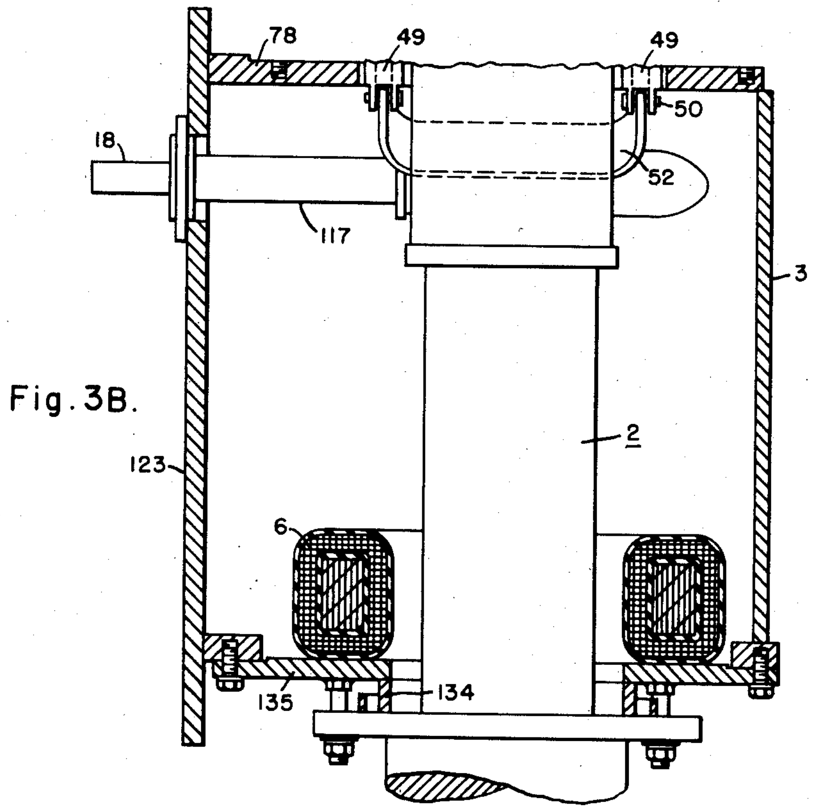

Although the circuit interrupter 1 is illustrated in Figs. 1 and 2 as being arranged in a generally horizontal position, it is to be understood that the invention is not limited to such a position, and, in fact, the circuit interrupter 1 may be mounted vertically, with suitable obvious modifications in the mechanism linkage, and Figs. 3A and 3B illustrate this concept of vertical mounting by showing the circuit interrupter 1 in a generally vertical position.

With particular reference to Figs. 3A and 3B of the drawings, it will be observed that the flanged closure cap 5 includes a cover casting 28 supporting a relatively stationary contact 29, a support ring 30 and an annular flange ring 31. Mounting bolts 32 fixedly secure the cover casting 28 to the support ring 30, and additional mounting bolts 33 secure the flanged ring 31 to the other side of the support ring 30. The flange ring 31 is secured to the end of the procelain casing 4 by cement 34, and suitable annular gaskets 35, 36 insure gas-tight connections.

The relatively stationary contact 29 is electrically connected with the cover casting 28, and hence to the line terminal 7, by means of a plurality of flexible fingers 37, integrally formed with a sleeve 38, the latter being threadedly connected, as at 39, to a downwardly extending boss portion 40 of the cover casting 28. A compression spring 42 biases the stationary contact 29 downwardly, and relieves the shock during the closing operation, as well as providing the requisite contact pressure between the relatively stationary contact 29 and a cooperating movable contact 43, the latter moving with a movable cylinder assembly, generally designated by the reference numeral 44.

The cylinder assembly 44 includes a movable operating cylinder 45 having a pair of diametrically positioned lug portions 46 integrally formed therewith, to which are pivotally connected, as at 47, a pair of longitudinally extending insulating operating rods 48. The lower ends of the operating rods 48 have bifurcated couplings 49, more clearly shown in Fig. 3B, which are pivotally connected, as at 50, to a yoke member 52, the latter being fixedly secured to the operating shaft 18.

Thus, rotation of the operating shaft 18 causes simultaneous rotation of the yoke member 52, which, through the operating rods 48, causes opening and closing longitudinal movement of the movable cylinder assembly 44.

Figure 4:
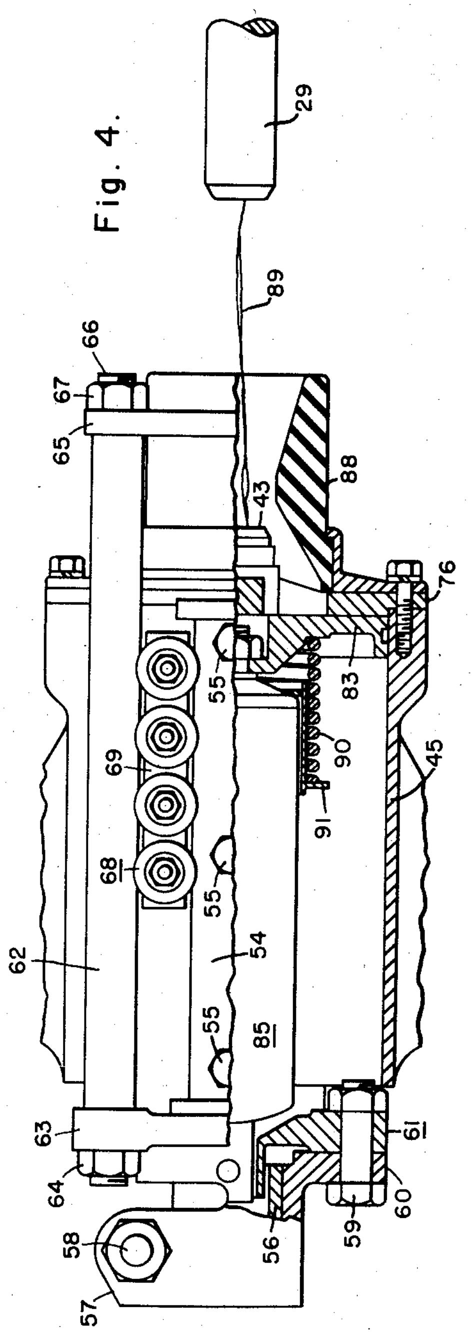
Fig. 4 is an enlarged side elevational view, partially in vertical section taken through the interrupting unit of the interrupting assembly of Fig. 3A.
Figure 5:
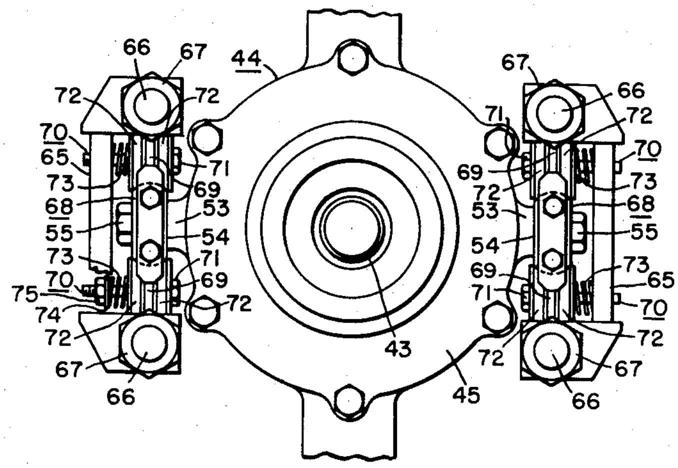
Fig. 5 is an enlarged front elevational view of the movable piston assembly.
Figure 6:
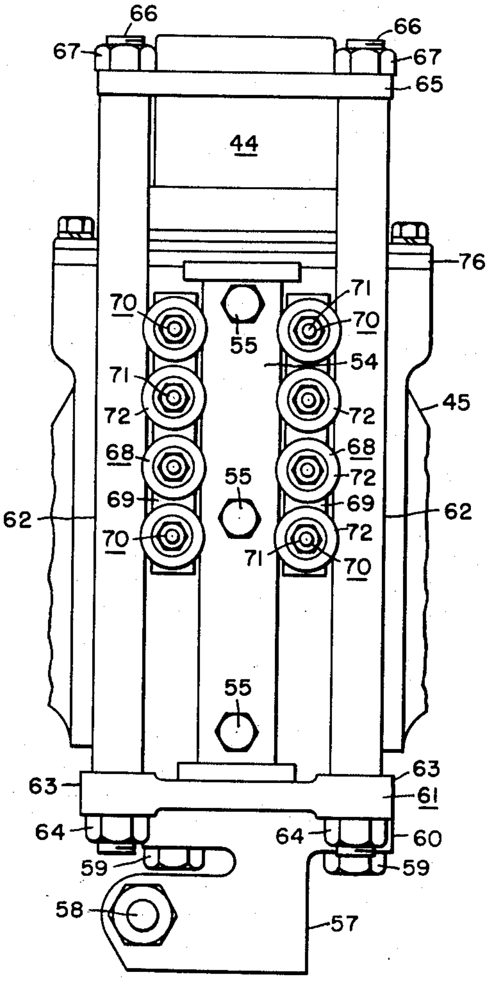
Fig. 6 is an enlarged side elevational view of a portion of the arc-extinguishing unit of the interrupter of Fig. 3A.

With particular reference to Fig. 5, it will be noted that the operating cylinder 45 has integrally formed therewith lugs 53, to which is bolted a pair of contact rails 54, more fully shown in Fig. 6 of the drawings, which move with cylinder 45. Bolts 55 fixedly secure the contact rails 54 to the opposite sides of the operating cylinder 45. It will be noted that secured to the upper end of the terminal bushing 2, as viewed in Fig. 3A, to the conductor stud 56 (Fig. 4) which passes therethrough, is a contact foot 57 thereaded thereto and clamped into place by a clamping bolt 58. Additional bolts 59, passing through a flanged portion 60 of the contact foot 57, secure thereto a spider casting 61 more clearly shown in Fig. 4. Conducting stationary rails 62, having reduced shoulder portions at the ends thereof, pass through lugs 63 of the spider casting 61. Nuts 64 fixedly secure the guide rails 62 stationarily in place. Maintaining the opposite ends of the guide rails 62 in position are a pair of cross-braces 65, suitable apertured to accommodate the reduced ends of the guide rails 62 Nuts 67, threaded on the ends 66, clamp the cross-braces 65 into position.

Interposed between the stationary guide rails 62 and the movable contact rails 54 are two pairs of contact-roller assemblies, generally designated by the reference numeral 68. Each contact roller assembly 68 includes a rectangular support plate 69 having four apertures therethrough, through each of which extends a roller shaft 70, in this particular instance assuming the form of a bolt 71 threading a pair of contact rollers, or wheels 72, more clearly shown in Fig. 5 of the drawings. A compression spring 73 encircles each bolt 71 and bears at one end against the outer contact roller 72 and at the other end against a washer 74, also encircling the bolt 71. A nut 75, threaded upon the outer end of the bolt 71, as shown in Fig. 5, holds the washer 74 in place and maintains the compression spring 73 in compression. The two contact rollers 72 on each bolt 71, are disposed on opposite sides of the rectangular support plate 69 and bear against the fixed and movable guide rails 54, 62.

As more clearly observed in Fig. 5, the contact rollers, or wheels 72 maintain, by virtue of the presence of the compression springs 73, good electrical contacting engagement with both the movable contact rails 54 and the stationary rails 62.

Not only do the several contact roller assemblies 68 maintain good contacting engagement between the rails 54, 62, but also they insure a substantially frictionless opening and closing movement of the movable cylinder assembly 44. Thus, the current path between the movable contact 43 and the terminal stud 56 includes the conducting contact foot 57, spider casting 61, stationary contact rails 62, the four roller assemblies 68, and the two movable guide rails 54, through the conducting operating cylinder 45 to the spider support ring 76, which has the movable contact 43 integrally formed therewith. The series of double current collector wheels 72, spring loaded, bridge the gap between the movable rails 54, secured to the movable operating cylinder 45, and the fixed tracks, or contact guide rails 62, fixedly secured to the interior end of the terminal bushing 2.

The wheels 72 act not only as current collectors, but also act to reduce friction loading, and avoid wear and galling, which may occur when using finger contacts during the passage of relatively high currents.

Insulating tension rods 77 are fixedly secured to a ring-shaped support plate 78 (Fig. 3B) of the mechanism housing casing 3. The outer ends of the insulating tension rods 77 are threaded, as at 79, and pass through the ring-shaped support plate 30 (Fig. 3A). Compression springs 80, interposed between the outer side of the support ring 30 and washers 81, secured by nuts 82 to the outer ends of the tension rods 77, insure that the support ring 30 will be resiliently biased toward the mechanism housing casing 3 to counteract the effect of internal pressure during arcing conditions. It is desirable to maintain the porcelain casing 4 in compression, and the four insulating tension rods 77, together with the compression springs 80, resiliently maintain compression upon the casing 4.

With particular reference to Fig. 3A, it will be noted that the operating cylinder 45 slides over a "fixed" piston 83, which initially, during the opening operation, is maintained stationary, but which subsequently moves with the operating cylinder 45 to increase the isolating gap between the contacts 29, 43 in the open-circuit position of the interrupter, as shown in Fig. 4 of the drawings.

The "fixed" piston 83 has a piston rod 84 affixed thereto, the latter moving within a shock absorber 85. The shock absorber 85 has characteristics such that during the initial opening movement it affords considerable resistance to any motion whatsoever of the "fixed" piston 83, thereby permitting a blast of fluid to be forced out of the region 86 (Fig. 3A) through the nozzle 88 of insulating material and against the arc 89 pictured in Fig. 4 for clarity. However, following a predetermined amount of opening movement of the operating cylinder 45, the characteristics of the shock absorber 85 are such that it will then permit the piston 83 to move downwardly, as viewed in Fig. 3A, and as indicated in Fig. 4, following the engagement of the piston 83 by the spider support ring 76, and the two will move together to the fully open-circuit position, indicated in Fig. 4, and providing a greater isolating gap between the contacts 29, 43 than would be provided should the piston 83 remain stationary at all times.

The particular construction of piston 83 remaining momentarily fixed in position, and then being retracted with the operating cylinder 45 to an open-circuit position is illustrated and claimed in United States patent application filed December 20, 1956, Serial No. 629,636 by Charles F. Cromer and Benjamin P. Baker, and assigned to the assignee of the instant application.

The piston 83 will be moved upwardly during a subsequent closing operation, as viewed in Fig. 3A, to its upper reset position by a retracting spring 90, the upper end of which seats upon the back side of the piston 83, and the lower end of which seats upon a flange 91, fixedly supported to the stationary shock absorber 85.

From the foregoing description it will be apparent that during the opening operation the mechanism disposed interiorly of the mechanism casing 9 is unlatched, thereby permitting the accelerating compression spring disposed in the spring housing 23 to force the spring rod 21 to the right, as viewed in Fig. 1, thereby rotating the operating shaft 18 in the opening direction. With particular reference to Figs. 3A and 3B, the rotation of the operating shaft 18 will, through the yoke 52 and the insulating operating rods 48, effect downward opening movement of the cylinder assembly 44 over the "fixed" piston 83. The relatively stationary contact 29 will follow the movable contact 43 until the shoulder 92 strikes the shoulder 93, thereby halting the relatively stationary contact 29, and drawing an arc 89 between the contacts 29, 43. The arc 89 is indicated in Fig. 4 for clarity, even though said figure indicates the fully open-circuit position of the contacts.

The downward opening movement of the operating cylinder 45 will not only compress the fluid within the region 86, forcing it upwardly past the spider casting 76 and through the orifice 88, but also it will continue to lengthen the arc 89, rendering the latter unstable. The intense blast of fluid through the orifice 88 adjacent the arc 89 will cause it to be extinguished, and the continued downward opening movement of the operating cylinder 45 will pick up the "fixed" piston 83 and will carry it downwardly, as permitted by the characteristics of the shock absorber 85. Fig. 4 indicates the relative position of the parts in the fully open-circuit position of the interrupter, with a considerable isolating gap between the contacts 29, 43 as permitted by the fact that the piston 83 is movable near the end of the opening stroke.

To close the interrupter, the mechanism within the mechanism casing 9 forces the operating rod 10 downwardly, rotating the operating shaft 13, and effecting, through the linkage, charging of the opening accelerating spring within spring tube 23, and at the same time causing closing rotative movement of the operating shaft 18. This will effect, through the yoke 52 and insulating operating rods 48, retracting, upward, closing motion of the cylinder assembly 44, as viewed in Fig. 3A, causing contact reengagement between the contacts 29, 43, and moving the relatively stationary contact 29 upwardly, compressing the contact spring 42 until the desired contact pressure is achieved.

During the upward closing movement of the operating cylinder 45, the retracting compression spring 90 will effect return movement of the "fixed" piston 83 until it again reaches its outer position, as shown in Fig. 3A.

Figs. 7A, 7B, 8A, 8B and 9 illustrate a modified form of the invention, in which a stationary piston 94 is employed, the latter being stationary at all times. As shown in Figs. 8B and 9, the fixed piston 94 is secured, by any suitable means, to the outer end of a slotted stationary cylinder 95 having slots 96 provided therein. The cylinder 95 is secured to a ring-shaped support plate 97, which is threaded, as at 98, to a reduced shoulder portion 99 of a contact foot 100. The contact foot 100 is threadedly secured, as at 101, to the threaded inner end of a terminal stud 102, the latter passing through the terminal bushing 2.

Movable longitudinally over the slotted stationary cylinder 95 is a movable operating cylinder 104, having guide lugs 105 threaded thereto. The inner ends 106 of the guide lugs 105 move in the slots 96 of the cylinder 95, and are guided thereby.

At the outer end of the movable operating cylinder 104 is fixedly secured a movable spider casting 107, the latter carrying the movable contact 108 at its center. The movable contact 108 cooperates with the relatively stationary contact 29, and has a guide extension 109. The guide extension 109 engages a plurality of flexible guide fingers 110, the latter being integrally formed with the contact foot 100. Secured by a flange 111, bolted by bolts 112 to the spider casting 107, is an insulating orifice 113. The orifice 113 has an orifice opening 114 therethrough, through which is drawn, during the opening operation, the arc 89 (Fig. 9) between the contacts 29, 108.

The general method of operation of this form of the invention will be readily apparent from the foregoing description, and will be only briefly described. The closed-circuit position of the modified form of the invention is shown in Figs. 7A, 7B, 8A, and 8B. As before, the operating shaft 18 is rotated by suitable means, as described above, and this effects, through the operating rods 48, opening movement of the movable cylinder assembly 115. This will cause separation to occur between the contacts 29, 108, drawing an arc 89, and will, in addition, compress the fluid within the region 116 within the operating cylinder 104. As before, this compressed fluid will be forced out through the orifice opening 114 of the orifice member 113 adjacent the arc 89 and will effect the latter's extinction. Fig. 9 illustrates the fully-open circuit position of the interrupter although the arc 89 has been drawn in for purposes of clarity. Current transfer between the movable contact 108 and the terminal stud 102 takes place through the laterally flexible contact fingers 110. The contact guide extension 109 telescopes within the contact foot 100, and thereby saves longitudinal space.

To effect the closing operation, the operating rods 48, as before, force the operating cylinder 104 and hence the movable contact 108 outwardly, so that the contacts 29, 108 make contacting engagement. As before, the contact compression spring 42 furnishes the proper contact pressure.

Figure 7A:
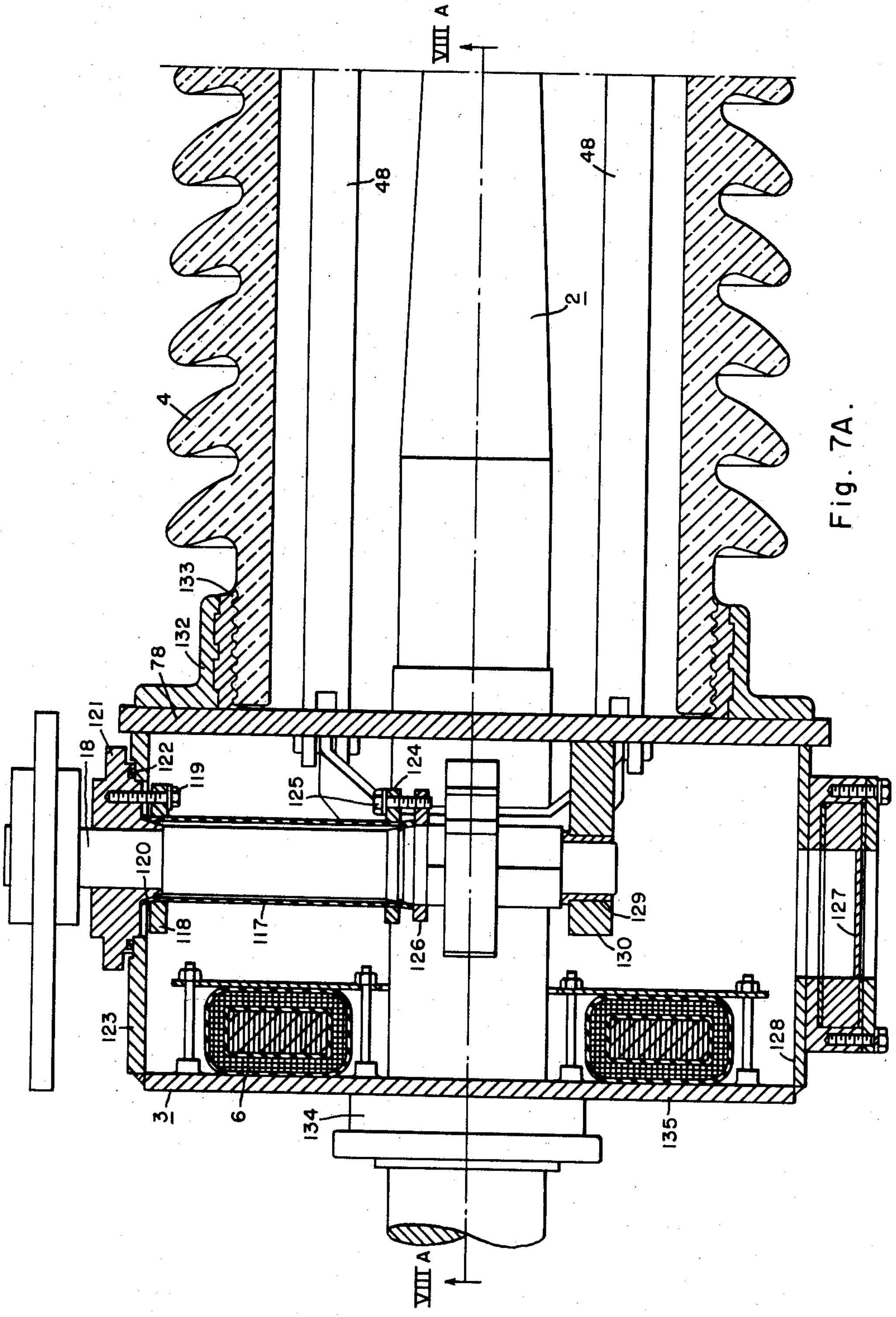
Figs. 7A and 7B represent a modified type of interrupting assembly, the views respectively being taken substantially along the lines VIIA—VIIA of Fig. 8A and VIIB—VIIB of Fig. 8B with the contact structure shown in the closed-circuit position.
Figure 7B:
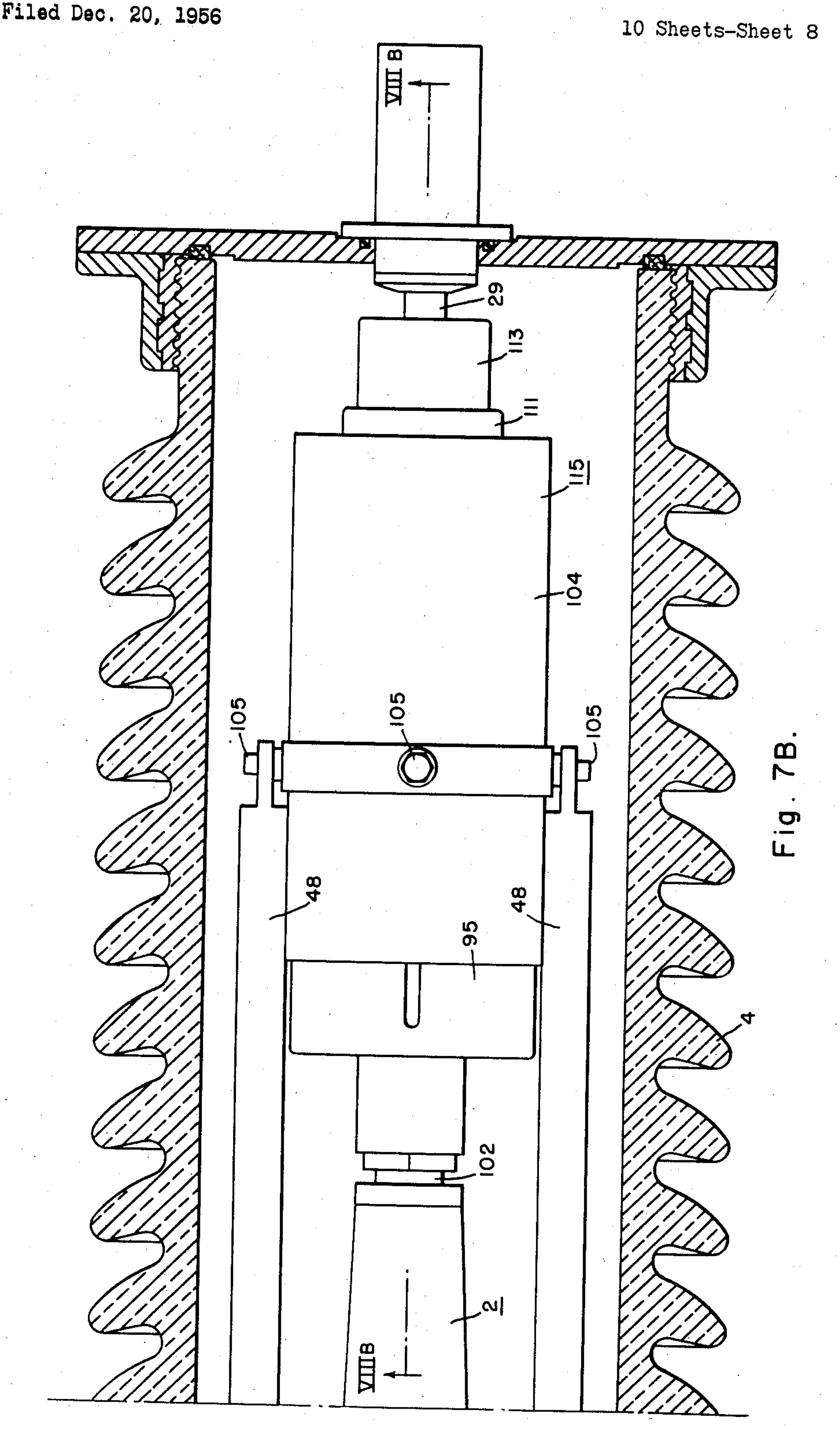

To insure a gas-tight connection along the operating shaft 18, flexible sleeve 117, more clearly shown in Fig. 7A, is employed, preferably made of a resilient rubber-like material. As shown, the outer end of the sleeve 117 is clamped by a ring 118 and bolts 119 to the beveled portion 120 of a bearing sleeve 121. The latter has a gasketed connection, as at 122, with a side plate 123 of the mechanism housing casing 3. The other end of the rubber-like sleeve 117 is clamped by a ring plate 124 and bolts 125 to a flange 126, the latter being secured, as by welding, to the inner extremity of the shaft 18. Thus although the operating shaft 18 rotates through an angle, say 60°, nevertheless the flexible sleeve 117 assumes this stress and prevents any gas leakage axially along the operating shaft 18. This sealing construction is set out and claimed in United States patent application filed April 9, 1956, Serial No. 576,875, by Harry J. Lingal, and assigned to the assignee of the instant application.

Although various fluids may be used in the interrupter of the invention, it is preferred to employ a gaseous fluid, and particularly sulfur hexafluoride ($SF_6$), the remarkable arc-extinguishing characteristics of which are set out, and claimed in United States Patent 2,757,261, issued July 31, 1956 to Harry J. Lingal, Thomas E. Browne, Jr., and Albert P. Strom, and assigned to the assignee of the instant application.

Using $SF_6$ as the insulating and arc-extinguishing medium within the casing 4, it is desirable to use for the orifice members 88, 113 polytetrafluoroethylene, the use of which in connection with $SF_6$ is claimed in the aforesaid Patent 2,757,261. Since this is a relatively expensive gas, the circuit interrupter 1 has a sealed construction, as described aforesaid, and once the interrupter is charged with a suitable quantity of $SF_6$ at the desired pressure, there will be no further necessity for replenishing the gas. If desired, a rupture disc 127, shown in Fig. 7A, may be employed for overpressure relief in connection with one of the side plates 128 of the mechanism housing casing 3 of the interrupter. The inner end of the shaft 18 may be journalled in a bearing 129, supported by a bracket 130, welded to the side plate 78 of the mechanism compartment 3. The lower end of the porcelain casing 4, as viewed in Fig. 3A, may be secured to the side plate 78 by an annular flange 132 and cement 133 in the manner indicated in Fig. 7A. The terminal bushing 2, which may be of the high-voltage condenser type, may be bolted to a support collar 134, the latter being welded to an apertured side plate 135, as illustrated in Fig. 8A.

From the foregoing description it will be apparent that the invention employs, as one of its features, a single-bushing construction, which is arranged to pump fluid, such as $SF_6$ gas through an orifice, in which an arc is drawn. To effect rapid extinction of this arc, and to prevent excessive friction losses from handicapping the operation of the interrupter when a moving cylinder arrangement is used, the roller construction 68 is employed. This greatly reduces friction losses, and insures proper guiding action. The invention is concerned, in part, with a novel arrangement of rollers, and guide rails, that not only provides low-rolling friction for the cylinder movement, but also provides a means of transferring current from the moving contact attached to the cylinder to the stationary terminal which passes through the bushing.

It will be noted that the terminal bushing 2 may be of substantially standard construction, and hence the circuit interrupter 1 is relatively cheap to manufacture. An important advantage of using a single bushing construction is that standard current transformers may be employed. By pumping gas through the arc, effective arc interruption is obtained without high pressure on the porcelain casing 4. The breaker can be mounted either vertically, or horizontally as convenient. The central body portion 3 is at ground potential.

Fig. 10 illustrates a circuit interrupter assemblage and shows one use for the circuit interrupter 1 in connection with a high-power interrupting assembly 136. The interrupting assembly 136 may consist of two arc-extinguishing units, generally designated by the reference numeral 137, and having a construction more fully described and claimed in United States Patent 2,748,226 issued May 29, 1956 to John B. MacNeill and Benjamin P. Baker, and assigned to the assignee of the instant application. The interrupting units 137, set out in the latter mentioned patent, may have shunting impedances, such as resistances 138, thereacross to adapt the same for heavy-duty performance by lowering the voltage recovery rate and also to provide satisfactory capacitance charging current interruption. The use of the circuit interrupter 1 in connection with such an arrangement insures interruption of the residual current, passing through the impedances 138 following interruption of the main-power arcs within the arc-extinguishing units 137. In addition, the impedance current circuit interrupter 1 provides the isolating gap distance for the entire arrangement in the open-circuit position, thereby permitting the contact structures to reclose within the interrupting units 137 in the open position of the device and the current transformer for the entire assemblage. As shown in Fig. 10, the operating linkage 179 for the circuit interrupter 1 may be operated from the same mechanism source 180, as operates the mechanism within the interrupting assemblage 136. The particular means for delaying the separation of the contacts within interrupter 1 until after arc interruption in high-power interrupting assembly 136 may assume a variety of forms, as well known by those skilled in the art. Reference may be had, for one possible form, to United States Patent 2,554,974 to John W. Beatty, illustrating one type of operating mechanism involving merely a considerable "wipe" travel at the isolating contacts to achieve the desired time-delay sequence between the two serially related interrupters.

From the above description it will be apparent that there is provided a novel simple type of circuit interrupter, preferably of the single-bushing type, which employs a substantially standard terminal bushing, having the advantages of a current transformer mounted at the grounded intermediate body support, and in addition providing a simplified operating linkage for effecting operation of a movable operating cylinder assembly. Contact separation and operating cylinder motion are simultaneously achieved by the use of insulating operating rods, moved by an operating shaft rotatable in the grounded body portion of the interrupter. The simplicity of the arrangement renders it adaptable for economical manufacture, and the device may not only be used by itself alone, but it may also be used in conjunction with heavy-power interrupting apparatus, in the manner disclosed in Fig. 10.

It will also be apparent that an improved roller contacting assembly is employed, not only to effect efficient current transfer between relatively stationary and movable contact parts, but also to bring about frictionless motion and accurate guiding movement. It is to be understood that the contact roller assemblage may be used in a multiplicity of circuit interrupting devices, wherein effective current transfer between relatively movable parts is desired. This feature of the invention is, of course, suitable for wide use.

Although there have been shown and described specific structures, it is to be clearly understood that the same were merely for the purpose of illustration, and that changes and modifications may readily be made therein by those skilled in the art, without departing from the spirit and scope of the invention.

I claim as my invention:

1. A circuit interrupter of the single-bushing type including an insulating casing, a terminal bushing having one end thereof projecting interiorly within one end of said casing, a mechanism casing supporting an intermediate portion of said terminal bushing, a relatively stationary contact associated with the other end of said insulating casing, a movable operating cylinder spaced inwardly from the inner wall of said casing and carrying a movable contact, the movable contact being separable from said relatively stationary contact to establish an arc, a piston supported by said one end of said terminal bushing, an orifice member carried by said movable operating cylinder through which said arc is drawn, and operating rod means operating from said mechanism casing and having one end thereof secured to the outer side of said movable operating cylinder to move said movable operating cylinder over said piston to force fluid through said orifice member at said established arc to effect the extinction thereof.

2. The combination in a fluid-blast circuit interrupter of grounded supporting means, means elevating said grounded supporting means up in the air, a terminal bushing having an intermediate portion thereof supported by said grounded supporting means, an insulating cylindrical casing supported by said grounded supporting means, said terminal bushing having one end thereof extending into one end of said cylindrical casing, a relatively stationary contact associated with the other end of said casing, a movable operating cylinder spaced inwardly from the inner wall of said casing and carrying a movable contact, the movable contact being separable from said relatively stationary contact to establish an arc, a piston supported by said one end of said terminal bushing, an orifice member carried by said movable operating cylinder through which said arc is drawn, means including an operating rod extending substantially axially of said terminal bushing and actuated from said grounded supporting means to move said movable operating cylinder over said piston to force fluid through said orifice member at said established arc to effect the extinction thereof, and the operating rod having one end thereof secured to the outer side of said movable operating cylinder.

3. A circuit interrupter assemblage including a high-power interrupting assembly and an impedance current interrupting assembly, said high-power interrupting assembly including one or more arc-extinguishing units, impedance means shunting each of one or more of said arc-extinguishing units, said impedance current interrupting assembly including a single terminal bushing having one end thereof extending within a cylindrical insulating casing, grounded supporting means for supporting an intermediate portion of said terminal bushing, a current transformer supported by said grounded supporting means and encircling said terminal bushing adjacent said intermediate portion thereof, said current transformer being adapted to measure the current flow through the entire circuit interrupter assemblage, means connecting said impedance current interrupting assembly in series electrically with said high-power interrupting assembly, contact means disposed within said cylindrical insulating casing separable to establish an impedance and an isolating break, and means delaying the separation of said contact means until after operation of said high-power interrupting assembly.

4. A circuit interrupter assemblage including a high-power interrupting assembly and an impedance current interrupting assembly, said high-power interrupting assembly including one or more arc-extinguishing units, impedance means shunting each of one or more of said arc-extinguishing units, said impedance current interrupting assembly including a single terminal bushing having one end thereof extending within a cylindrical insulating casing, grounded supporting means for supporting an intermediate portion of said terminal bushing, a current transformer supported by said grounded supporting means and encircling said terminal bushing adjacent said intermediate portion thereof, said current transformer being adapted to measure the current flow through the entire circuit interrupter assemblage, means connecting said impedance current interrupting assembly in series electrically with said high-power interrupting assembly, contact means disposed within said cylindrical insulating casing separable to establish an impedance and an isolating break, piston means movable with said contact means and supported by said one end of said terminal bushing, means operable from an intermediate part of said terminal bushing at said grounded supporting means to separate said contact means, and means delaying the separation of said contact means until after operation of said high-power interrupting assembly.

5. A circuit interrupter including a movable contact separable from a relatively stationary contact to establish an arc, a movable guide rail, means electrically connecting said movable guide rail to said movable contact, a relatively stationary guide rail spaced from said movable guide rail, and a contact roller assembly including one or more contact rollers disposed in the space between the relatively stationary and movable guide rails.

6. A circuit interrupter including a movable contact separable from a relatively stationary contact to establish an arc, a movable guide rail, means electrically connecting said movable guide rail to said movable contact, a relatively stationary guide rail spaced from said movable guide rail, a contact roller assembly including an apertured support plate, one or more pairs of contact rollers mounted in the apertures of said support plate, and the one or more pairs of contact rollers being disposed in the space between the relatively stationary and movable guide rails.

7. A circuit interrupter of the fluid-blast type including a movable operating cylinder, a relatively stationary piston positioned within said movable operating cylinder, a relatively stationary contact, a movable contact carried by said movable operating cylinder and separable from said relatively stationary contact to establish an arc, the relative movement between said movable operating cylinder and said relatively stationary piston forcing fluid toward said arc to effect the extinction thereof, a movable guide rail secured to said movable operating cylinder, a relatively stationary guide rail, means spacing said guide rails apart, and a movable contact roller assembly including one or more pairs of contact rollers disposed between said guide rails.

8. A circuit interrupter of the fluid-blast type including grounded supporting means, a grounded mechanism housing casing having crank means associated therewith, an insulating cylindrical casing supported by said grounded mechanism housing casing, a terminal bushing having an intermediate portion thereof supported by said mechanism housing casing and having one end thereof extending interiorly within one end of said insulating cylindrical casing, a relatively stationary contact associated with the other end of said insulating cylindrical casing, guide means supported by said one end of said terminal bushing, a movable operating cylinder spaced inwardly from the inner wall of said casing and supported by said guide means, the movable operating cylinder carrying a movable contact, the movable contact being separable from the relatively stationary contact to establish an arc, a piston disposed interiorly of said movable operating cylinder and supported by said one end of said terminal bushing, operating rod means extending generally longitudinally of said terminal bushing and interconnecting said crank means with the outer side of said movable operating cylinder, and the crank means being operable to effect through said operating rod means movement of said movable operating cylinder over said piston to force fluid at the established arc to effect the extinction thereof.

9. A circuit interrupter of the fluid-blast type including grounded supporting means, a grounded mechanism housing casing having crank means associated therewith, a drive shaft extending through a side wall of said mechanism housing casing for effecting rotation of said crank means, an insulating cylindrical casing supported by said grounded mechanism housing casing, a terminal bushing having an intermediate portion thereof supported by said mechanism housing casing and having one end thereof extending interiorly within one end of said insulating cylindrical casing, a relatively stationary contact associated with the other end of said insulating cylindrical casing, guide means supported by said one end of said terminal bushing, a movable operating cylinder spaced inwardly from the inner wall of said casing and supported by said guide means, the movable operating cylinder carrying a movable contact, the movable contact being separable from the relatively stationary contact to establish an arc, a piston disposed interiorly of said movable operating cylinder and supported by said one end of said terminal bushing, a pair of insulating operating rods interconnecting said crank means to the opposite external sides of said movable operating cylinder, and the drive shaft being effective to drive through said crank means and the pair of insulating operating rods movement of said movable operating cylinder over said piston to force fluid at the established arc to effect the extinction thereof.

10. A circuit interrupter of the fluid-blast type including grounded supporting means, a grounded mechanism housing casing having crank means associated therewith, an insulating cylindrical casing supported by said grounded mechanism housing casing, a terminal bushing having an intermediate portion thereof supported by said mechanism housing casing and having one end thereof extending interiorly within one end of said insulating cylindrical casing, a relatively stationary contact associated with the other end of said insulating cylindrical casing, guide means supported by said one end of said terminal bushing, a movable operating cylinder spaced inwardly from the inner wall of said casing and supported by said guide means, the movable operating cylinder carrying a movable contact and an orifice member, the movable contact being separable from the relatively stationary contact to establish an arc, a piston disposed interiorly of said movable operating cylinder and supported by said one end of said terminal bushing, operating rod means extending generally longitudinally of said terminal bushing and interconnecting said crank means with the outer side of said movable operating cylinder, and the crank means being operable to effect through said operating rod means movement of said movable operating cylinder over said piston to force fluid through said orifice member at the established arc to effect the extinction thereof.

11. A circuit interrupter of the fluid-blast type including grounded supporting means, a grounded mechanism housing casing having crank means associated therewith, a drive shaft extending through a side wall of said mechanism housing casing for effecting rotation of said crank means, an insulating cylindrical casing supported by said grounded mechanism housing casing, a terminal bushing having an intermediate portion thereof supported by said mechanism housing casing and having one end thereof extending interiorly within one end of said insulating cylindrical casing, a relatively stationary contact associated with the other end of said insulating cylindrical casing, guide means supported by said one end of said terminal bushing, a movable operating cylinder spaced inwardly from the inner wall of said casing and supported by said guide means, the movable operating cylinder carrying a movable contact and an orifice member, the movable contact being separable from the relatively stationary contact to establish an arc, a piston disposed interiorly of said movable operating cylinder and supported by said one end of said terminal bushing, a pair of insulating operating rods interconnecting said crank means to the opposite external sides of said movable operating cylinder, and the drive shaft being effective to drive through said crank means and the pair of insulating operating rods movement of said movable operating cylinder over said piston to force fluid through said orifice member at the established arc to effect the extinction thereof.

References Cited in the file of this patent

UNITED STATES PATENTS

| | | |
|---|---|---|
| 2,095,441 | Howe | Oct. 12, 1937 |
| 2,667,556 | Van Sickle et al. | Jan. 26, 1954 |
| 2,748,226 | MacNeil et al. | May 29, 1956 |
| 2,788,418 | Owens et al. | Apr. 9, 1957 |

FOREIGN PATENTS

| | | |
|---|---|---|
| 828,466 | France | Feb. 14, 1938 |
| 869,813 | Germany | Mar. 9, 1953 |